United States Patent
Zhou et al.

(10) Patent No.: US 10,464,503 B2
(45) Date of Patent: Nov. 5, 2019

(54) ENGINE HOOD INSULATOR IN A VEHICLE AND A VEHICLE INCLUDING THE SAME

(71) Applicant: FORD GLOBAL TECHNOLOGIES, LLC, Dearborn, MI (US)

(72) Inventors: Jason Zhou, Nanjing (CN); Derek Kang, Nanjing (CN); Lina Liu, Nanjing (CN); Fei Fei Xie, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 15/592,323

(22) Filed: May 11, 2017

(65) Prior Publication Data

US 2017/0341601 A1 Nov. 30, 2017

(30) Foreign Application Priority Data

May 26, 2016 (CN) .......................... 2016 1 0357303

(51) Int. Cl.
*B60R 13/08* (2006.01)
*B62D 25/12* (2006.01)
*B62D 25/10* (2006.01)

(52) U.S. Cl.
CPC ........ *B60R 13/0838* (2013.01); *B62D 25/105* (2013.01); *B62D 25/12* (2013.01)

(58) Field of Classification Search
CPC .... B62D 25/12; B62D 25/105; B60R 13/0838

USPC ...................................................... 296/193.11
See application file for complete search history.

(56) References Cited

U.S. PATENT DOCUMENTS

| 6,378,640 | B1* | 4/2002 | Dewey | .................... B60R 11/00 |
| | | | | 180/69.2 |
| 2014/0305140 | A1* | 10/2014 | Hasegawa | ............... F02B 77/13 |
| | | | | 62/3.2 |

FOREIGN PATENT DOCUMENTS

| CN | 203358492 U | 12/2013 |
| JP | 2007290625 A | 11/2007 |
| KR | 19970041636 A | 7/1997 |
| WO | 2012176560 A1 | 12/2012 |

OTHER PUBLICATIONS

English Machine Translation of CN203358492U.
English Machine Translation of JP2007290625A.
English Machine Translation of KR19970041636A.
English Machine Translation of WO2012176560A1.

* cited by examiner

*Primary Examiner* — Joseph D. Pape
*Assistant Examiner* — Dana D Ivey
(74) *Attorney, Agent, or Firm* — Jason Rogers; Vichit Chea; King & Schickli, PLLC

(57) ABSTRACT

An engine hood insulator is provided. The engine hood insulator includes an insulating layer and a plurality of first elastic connecting elements coupled with the insulating layer. The first elastic connecting elements are detachably connected with a plurality of second connecting elements disposed on a lower surface of the engine hood.

17 Claims, 6 Drawing Sheets

ENGINE HOOD INSULATOR IN A VEHICLE AND A VEHICLE INCLUDING THE SAME

TECHNICAL FIELD

The present disclosure relates to an insulator in a vehicle and, more particularly, relates to an engine hood insulator.

BACKGROUND

An engine in a vehicle creates noises during running of the vehicle. To improve comfort for passengers in the vehicle, it is common to incorporate an insulating device or noise reduction device in an engine compartment to reduce the noises caused by vibration of the engine. A conventional insulator consists of a plurality of layers, and the layer contacting the engine hood is fixed under the lower surface of the engine hood via adhesives or rivets. It can be difficult to remove the insulator from the engine hood, and thus not convenient for maintenance and replacement. Another type of conventional insulator is removably connected to an inner panel of the engine hood via a plurality of plastic clips. In order to assemble the plastic clips, the insulator may be formed with mounting holes. Chinese patent application No. CN201646598U discloses an engine hood insulator for a vehicle which defines a number of through holes for mounting several other parts of the vehicle. On the one hand, the assembly of the insulator may require a number of clips and thus will cause high production cost. On the other hand, the through holes not only reduce an insulating area of the insulator which can affect its insulation performance, but also create an uneven thickness of the insulator which can affect its appearance.

SUMMARY

According to one aspect of the present disclosure, an engine hood insulator in a vehicle is provided. The engine hood insulator is low in cost, simple in structure, and has an aesthetic appearance and better insulating performance. Further, the engine hood insulator is easy to assembly and remove, thus it is easy for maintenance and replacement.

The engine hood insulator includes an insulating layer and a plurality of first elastic connecting elements coupled with the insulating layer. The first elastic connecting elements may be detachably connected with a plurality of second connecting elements disposed on a lower surface of the engine hood.

In an embodiment, the engine hood insulator further includes an inner layer and an outer layer. The insulating layer is disposed between the inner and outer layers, and the first elastic connecting elements are disposed on a surface of the inner layer.

In an embodiment, each of the first elastic connecting elements has two opposite ends and a middle part between the two ends. The middle part is fixed on the surface of the inner layer and capable of being extended or retracted from the surface of the inner layer.

In an embodiment, each of the first elastic connecting elements includes rubber.

In an embodiment, each of the first elastic connecting elements is connected to the surface of the inner layer via adhesion, sewing, stapling, or combinations thereof.

In an embodiment, the first elastic connecting elements are arranged as a plurality of columns along a lengthwise direction on the surface of the inner layer.

In an embodiment, the engine hood insulator further includes a washer disposed between one of the first elastic connecting elements and the surface of the inner layer.

In an embodiment, the insulating layer is porous.

In an embodiment, the insulating layer includes polyurethane foaming polymer, resin felt, glass fiber, and combinations thereof.

In an embodiment, the inner and outer layers may each independently contain fabrics.

In an embodiment, the inner layer is formed from elastic material and includes a plurality of pairs of notches. The first elastic connecting elements are defined by elastic materials of the inner layer between the notches.

According to another aspect of the present disclosure, an engine hood assembly in a vehicle is provided. The engine hood assembly includes an engine hood and an insulator coupled with the engine hood. The insulator includes an inner layer, an outer layer, an insulating layer disposed between the inner and outer layers, and a plurality of first elastic connecting elements coupled with a surface of the inner layer. Each of the first elastic connecting elements includes two opposite ends fixed on the surface of the inner layer and a middle part between the two ends. The engine hood includes a lower surface facing the insulator and a plurality of second connecting elements disposed on the lower surface of the engine hood. The middle part of each of the first elastic connecting elements is configured to retain the corresponding second connecting elements such that the insulator is detachably connected with engine hood.

In an embodiment, the second connecting elements are made from metal and integrally formed with the engine hood.

In an embodiment, the second connecting elements are connected to the lower surface of the engine hood via welding, riveting, clamping, clipping, or combinations thereof.

In an embodiment, each of the second connecting elements has a fixed end connected to the lower surface of the engine hood, and a body extending away from the lower surface of the engine hood and forming an angle with the lower surface. The body and the lower surface of the engine hood define a space therebetween.

In an embodiment, the angle is in a range of 0 to about 5 degrees.

In an embodiment, the second connecting element is positioned in a direction such that the space opens to an insertion direction of the insulator.

In an embodiment, each of the second connecting elements further includes a retaining part at the free end and extending from the body towards the lower surface of the engine hood.

In an embodiment, the retaining part and the lower surface of the engine hood define an insertion gap therebetween. The insertion gap has a size no larger than a thickness of the middle part of the first elastic connecting elements.

In an embodiment, the first elastic connecting elements are arranged as a plurality of columns along a lengthwise direction, and the second connecting elements are arranged as a plurality of columns along the lengthwise direction corresponding to the columns of the first elastic connecting elements.

In an embodiment, the engine hood includes an outer panel and an inner panel connected under the outer panel, the inner panel faces the engine, and the second connecting elements are disposed on a lower surface of the inner panel.

According to another aspect of the present disclosure, a vehicle including the engine hood assembly is provided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

DETAILED DESCRIPTION OF ONE OR MORE EMBODIMENTS

Figure 1:
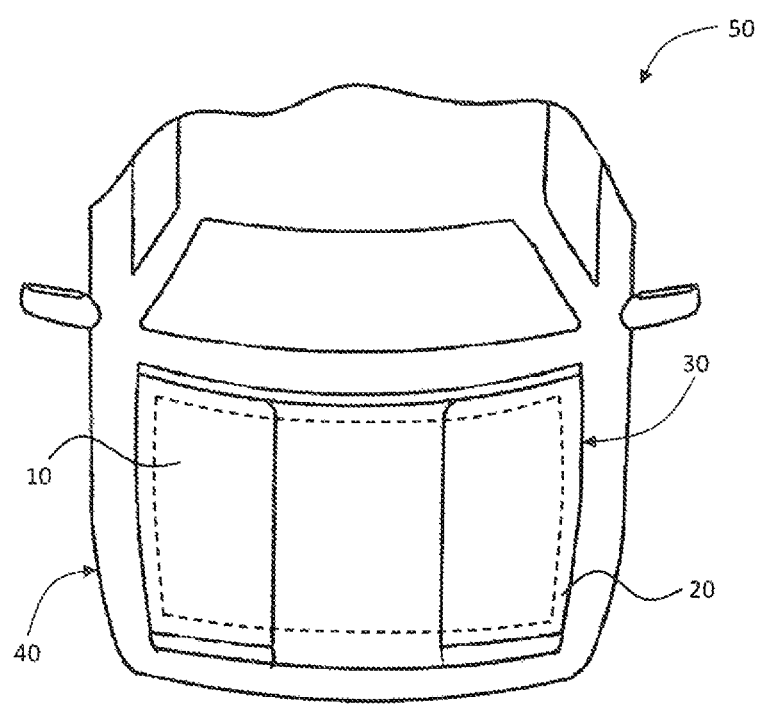
FIG. 1 is a top view showing a portion of a vehicle according to an embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It should be understood when an element is referred to as being "connected" or "coupled" or fixed or the like to another element, it can be directly connected or coupled to the other element or intervening elements may be present. In contrast, when an element is referred to as being "directly connected" or "directly coupled" or "directly fixed" to another element, there are no intervening elements present.

Noise vibration harshness (NVH) is one of the aspects that attention is paid to during vehicle performance evaluation. To improve passenger comfort, it is common to incorporate an insulator under an engine hood of a vehicle to reduce the noises caused by the engine. As a component for reducing NVH, the insulator is required to have as large a valid insulation area as possible and be easy to assemble.

The inventors of the present disclosure have recognized some problems in an existing engine hood assembly. A conventional engine hood insulator may be fixed on a lower surface of the engine hood via adhesives or rivets. Although the insulator is reliably secured to the engine hood, it is difficult to remove and thus unfavorable for maintenance and replacement. Another type of insulator includes a plurality of through holes, and the insulator is connected to the engine hood via a plurality of clips. Altough the insulators can be removed from the engine hood, the clips may increase a manufacturing cost for the vehicle. Further, the through holes formed in the insulator reduces its valid insulation area and affects its insulation performance.

The present disclosure provides an engine hood insulator for a vehicle, an engine hood assembly for a vehicle, and a vehicle including the engine hood assembly. The engine hood insulator according to embodiments of the present disclosure is low in cost, simple in structure, easy to assemble and remove, and has asthestic appearance and better insulation performance.

FIG. 1 is a schematic view showing a front end of a vehicle 50 according to an embodiment of the present disclosure, illustating an engine hood assembly 30 disposed above an engine compartment 40 of the vehicle 50. The engine hood assembly 30 may include an engine hood 20 and an engine hood insulator 10 (referred to as insulator 10 hereinafter) disposed on a lower surface of the engine hood 20 for absorbing and reducing noises produced by an engine system of the vehicle 50.

Figure 2:
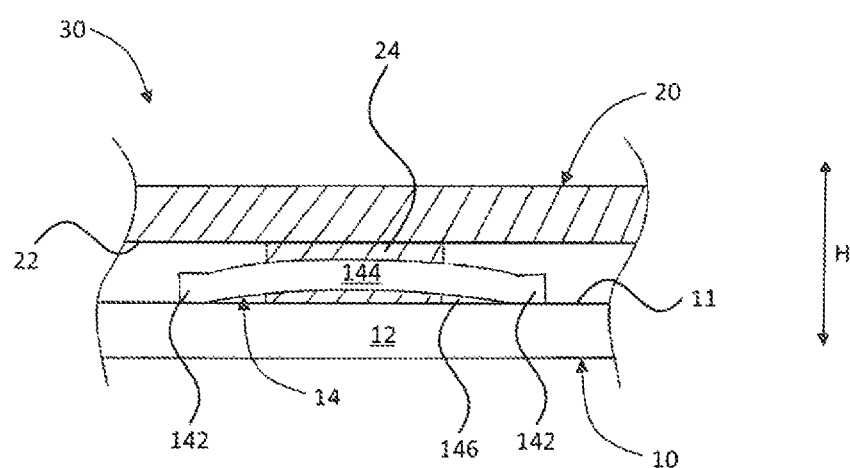
FIG. 2 is a cross-sectional view showing a portion of an engine hood assembly in a vehicle according to an embodiment of the present disclosure.
Figure 3:
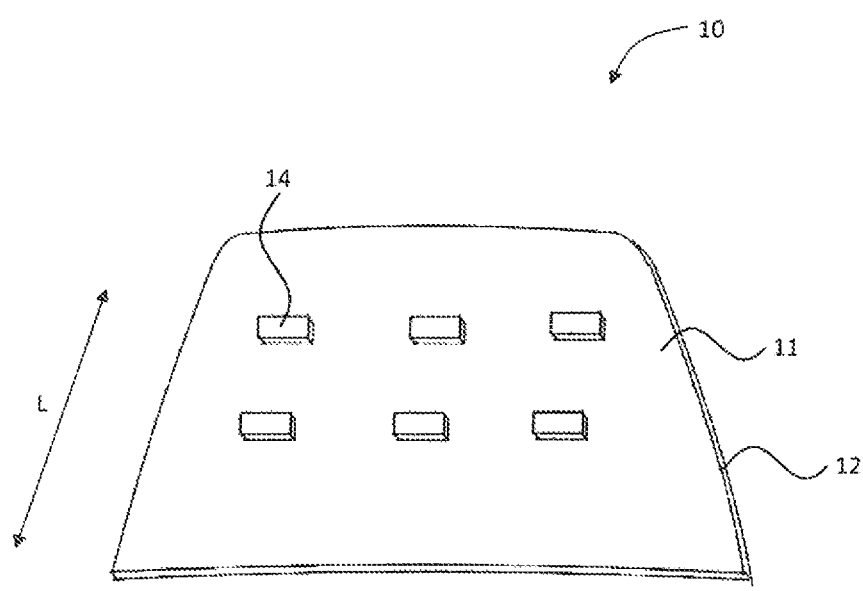
FIG. 3 is a top view of the engine hood insulator in the engine hood assembly in FIG. 2.

FIG. 2 is an enlarged cross-sectional view of a portion of the engine hood assembly 30 in FIG. 1, illustrating the engine hood 20 and the insulator 10 disposed on the lower surface of the engine hood 20. FIG. 3 is a perspective view of the insulator 10 in FIG. 2, illustating an inner surface 11 of the insulator 10 connected with a first elastic connecting element 14. With reference to FIGS. 2 and 3, the insulator 10 includes an insulating layer 12 and a plurality of first elastic connecting elements 14 coupled with the insulating layer 12. In some embodiments, the plurality of first elastic connecting elements 14 are coulpled with the inner surface 11 of the insulator 10. In the embodiment depicted in FIG. 2, the inner surface 11 of the insulator 10 may refer to an inner surface of the insulating layer 12, for example, a surface of the insulating layer 12 that is substantially parallel to the horizontal plane and positioned higher in a height direction H of the vehicle, i.e. a surface of the insulating layer 12 that faces the engine hood 20 instead of the engine system. It should be appreciated that, in some embodiments in which the insulator 20 has an inner layer, the inner layer may refer to the inner surface of the inner layer, that is, there is an intervening layer between the first elastic connecting elements 14 and the insulating layer 12. Each of the first elastic connecting elements 14 includes two opposite ends 142 fixed on the insulating layer 12 and a middle part 144 between these two ends 142. The middle part 144 may be formed from elastic material like rubber and may stretch away from the inner surface 11 of the insulator 10 (i.e. inner surface 11 of the insulating layer 12) by a force and tend to return toward the inner surface 11. In other words, the middle part 144 may be deformed to form a receiving portion 146 between the insulating layer 12 and the first elastic connecting element 14 in direction H or retracted to engage with an connecting element disposed on the engine hood 20 (for example, a plurality of second connecting elements 24) such that the insulator 10 is connected to the engine hood 20.

The engine hood 20 includes a lower surface 22 facing the insulator 10 and a plurality of second connecting elements 24 disposed on the lower surface 22 and corresponding to the first elastic connecting elements 14 of the insulator 10. The second connecting element 24 of the engine hood 20 may be received or retained by the middle part 144 of the first elastic connecting element 14 such that the insulator 10 is connected with the engine hood 20.

It should be appreciated that the terms "correspond to" or "corresponding to" used in this specification may mean that a first element may overlap with at least a portion of a second element after assembly of the first and second elements, or alternatively may mean that the first and second elements may form a removable or detachable connection therebetween. For example, the first elastic connecting elements 14 are corresponding to the second connecting elements 24 which may mean that the first elastic connecting elements 14 may overlap with at least a portion of the second connecting elements. In other words, projections of the first and second connecting elements 14, 22 on the inner surface of the insulator 10 partially overlap with each other, and the first elastic connecting element 14 and the second connecting element 24 may form a removable or detachable connection.

In some embodiments, the middle part 144 of the first elastic connecting element 14 may be coupled with the inner surface 11 of the insulator 10 prior to the assembly of the insulator 10. In other words, there is substantially no gap between a lower surface of the middle part 144 and the inner surface 11 of the insulator 10 in direction H (not shown). During assembly of the insulator 10, the insulator 10 may be moved toward the engine hood 20, while each of the second connecting elements 24 connected on the lower surface of the engine hood 20 may be be inserted into the space between the middle part 144 of the one of the first elastic connecting elements 14 of the insulator 10. Specifically, the insertion of the second connecting elements 24 may cause the middle part 144 to stretch and move away from the inner surface of the insulator 10, thus defining a space between the first elastic connecting elements 14 and the inner surface 11 of the insulator 10 where the second connecting elements 24 may be received, as shown in FIG. 2. Upon receiving the second connecting elements 24, the flexible or elastic middle part 144 may retract to retain the second connecting elements 24, thus connecting the insulator 10 under the engine hood 20. In some embodiments, before assembly of the insulator, the middle part of each of the first elastic connecting elements 14 and the inner surface 11 of the insulator 10 may define a gap or space therebetween such that the assembly of the insulator may be facilitated.

In one or more embodiments, the second connecting elements 24 may be formed from metal which are integral with the engine hood 20. Alternatively, the second connecting elements may be not integral with the engine hood 20. For example, the second connecting elements 24 may be connected to the engine hood by common connecting means in the art, such as welding, riveting, clapping, or combinations thereof. It should be appreciated that there are no special limitations in the present disclosure regarding the connecting means, while those with ordinary skill in the art can apply any suitable method to connect the second connecting elements 24 to the engine hood 20, which should not be excluded from the scope of the present disclosure. In some embodiments, the engine hood may comprise an outer panel and an inner panel connected to and located above the outer panel, the lower surface of the engine hood may be a lower surface of the outer panel of the engine hood.

In one or more embodiments, the first elastic connecting elements 14 may be formed from elastic material, such as rubber. According to some embodiments of the present disclosure, there is no special limit to the elasticity or flexibility of the first elastic connecting elements 14, provided their stretching or retracting performances enables the second connecting elements 24 to be received and retained. Further, the elasticity or flexibility of the first elastic connecting elements 14 may vary according to material or thickness thereof of the second connecting element 24. For example, the first elastic connecting elements 14 may have a smaller elasticity or flexiblity if the second connecting elements 24 have a larger rigidity and smaller thickness, and in turn having a larger elasticity or flexibility if the second connecting elements 24 have a smaller rigidity and larger thickness.

In one or more embodiments, the first elastic connecting elements 14 may be connected to the inner surface 11 of the insulator 10 via adhering, sewing, stapling, or combinations thereof. It should be appreciated that those with ordinary skills in the art may use other method to fix the ends 142 of the first elastic connecting elements 14 to the insulating layer 12, which are also included in the protection scope of this disclosure.

In one or more embodiments, the insulator 10 further includes a washer (not shown) disposed between the insulating layer 12 and the first elastic connecting elements 14. For example, for each of the first elastic connecting elements 14, two washers may be provided, each disposed between one fixed end 142 and the inner surface 11 of the insulating layer. With the washer, a more reliable connection may be achieved between the first elastic connecting elements 14 and the insulating layer 12. In addition, damage or wear to the first elastic connecting elements 14 may be reduced, thus the technical life of the insulator 10 may be extended.

In one or more embodiments, the insulating layer 12 is porous (not shown), such the insulating layer 12 may have a honey comb structure, for example. The insulating layer 12 may contain polyurethane foaming polymer, resin felt, glass fiber, and combinations thereof. The insulating layer 12 has materials or structure that is known to those with ordinary skill in the art, thus will not be described in detail here.

Referring to FIG. 3, in one or more embodiments, the first elastic connecting elements 14 may be arranged as a plurality of spaced columns on the inner surface 11 of the insulator 10 in a lengthwise direction L of the vehicle. Accordingly, the second connecting elements 24 may be arranged as a plurality of spaced columns on the lower surface of the engine hood 20 in direction L (not shown). The second connecting elements 24 below the engine hood 20 may correspond to the first elastic connecting elements 14 of the insulator 10 respectively.

Figure 4:
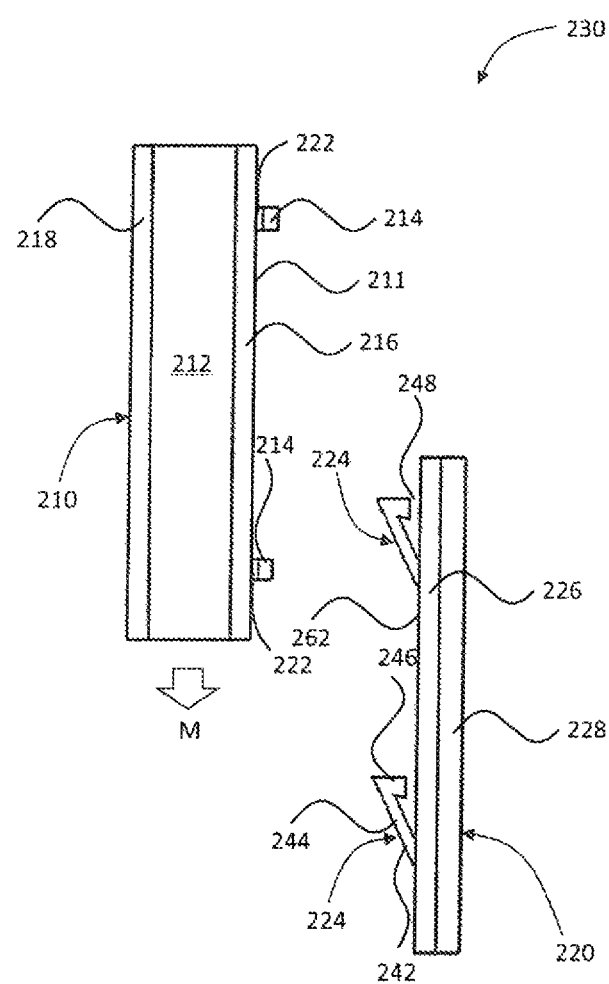
FIG. 4 is a cross-sectional view of an engine hood assembly in a vehicle according to another embodiment of the present disclosure.

FIG. 4 is a cross-sectional view of an engine hood assembly 230 for a vehicle according to an embodiment of the present disclosure. The engine hood assembly 230 is substantially similar to that shown in FIG. 3, with differences in structures of the insulator and the engine hood.

Referring to FIG. 4, in one or more embodiments, the insulator 210 further includes an outer layer 218 facing the engine and an inner layer 216 facing the engine hood 220. An insulation layer 212 is disposed between the outer and inner layers 218, 216, and a plurality of first elastic connecting elements 214 are coupled with an inner surface 211 of the insulator 210. In some embodiments, the first elastic connecting elements 214 are disposed on or directly coupled with an inner surface of the inner layer 216 (e.g. the upper surface of the inner layer 216 in a height direction H of the vehicle). In one or more embodiments, the insulator 210 may further include a washer 222 disposed between the inner layer 216 and the first elastic connecting elements 214. In some embodiments, the inner and outer layers 216, 218 may each independently contain fabrics, and may be formed from the same or different materials. The materials for the inner and outer layers 216, 218 are known to those with ordinary skills in the art, and details thereof are omitted herein.

With reference to FIG. 4, in one or more embodiments, the engine hood 220 may include an outer panel 228, an inner panel 226 connected below the outer panel, and a plurality of second connecting elements 224. The inner panel 226 faces the insulator 210, while the second connecting elements 224 are connected on a lower surface of the inner panel 226. It is known to those with ordinary skills in the art that the inner panel 226 of the engine hood 220 may be formed with a plurality of mounting holes (not shown). In some embodiments, the second connecting elements 224 may be connected with or defined by the mounting holes during a manufacturing process of the engine hood 220. In other words, the second connecting elements 224 may be integrally formed with the engine hood, or alternatively integrally formed with the inner panel 226 of the engine hood 220. In some embodiments, the second connecting elements 224 may be connected on the inner surface 262 of the inner panel 226 after the manufacturing process of the engine hood 220 with connecting means known to those skilled in the art, such as welding, clapping, and combinations thereof. In this way, the engine hood assembly may be easy to prepare and low in manufacturing cost.

In some embodiments, as shown in FIG. 4, the second connecting elements 224 may include a fixed end 242 and a body 244 connected with the fixed end 242. The fixed end 242 is connected to the inner surface 262 of the engine hood 220, for example, the inner surface of the inner panel 226 of the engine hood. The body 244 extends from the fixed end 242 toward a direction away from the inner surface 262 of the engine hood 220. In some embodiments, the body 244 and the engine hood 220 define an angle therebetween. For example, the body 244 and the inner surface 262 of the engine hood 220 define a space 248. The space 248 may open to an insertion direction M of the insulator 210. With reference to FIG. 4, the body 244 and the inner panel 226 of the engine hood 220 define an angle $\alpha$ in a range of 0 to about 5 degrees, for example, about 1 to about 4 degrees, or alternatively, about 2 to about 3 degrees. With the angle $\alpha$ in the described range, the first elastic connecting elements 214 may be inserted to the space 248 during assembly of the insulator 210, or the body 244 of the second connecting elements 224 may be inserted between the middle part of the first elastic connecting elements 214 and the inner layer 216 during assembly, thus forming a space or gap therebetween to retain the body 244. On the other hand, after assembly of the insulator 210, the outer layer of the insulator 210 (for example, an outer surface of the outer layer 218) may have a flat and aethestic surface because the connection positions between the first elastic connecting element 214 and the second connecting element 224 are not disposed on the outer layer 218 which is visible to the users, and thus protrusions or appearance of the connecting clips commonly seen in conventional engine hood insulators may be avoided. Further, the insulator 210 is easy to assemble.

It should be appreciated that the angle $\alpha$ is described for purposes of illustration and is not intended to limit the scope of the present disclosure. Those with ordinary skills in the art may select other angles to properly achieve the embodiments of the present disclosure, and those angles are also in the scope of the present disclosure. For example, during a practical assembly or manufacturing process of the engine hood assembly, those with ordinary skill in the art may select any angles to perform the embodiment of the present disclosue according to a thickness or hardness of the second connecting elements, a thickness or flexiblity of the first elastic connecting elements, a total thickness of flexiblility of the insulator, and combinations thereof.

In some embodiments, the body 244 of the second connecting part may be positioned to be extended in an insertion direction M of the insulator 210, as shown in FIG. 4. After assembly of the insulator, the middle part of the first elastic connecting elements 214 may retract due to its elasticility so as to retain or hold the second connecting elements 224. In other words, the body 244 of the second connecting elements 224 is inserted and received in the space between the middle part of the first elastic connecting elements 214 and the inner layer 216 of the insulator 210. The middle part of the first elastic connecting elements 214 may tend to return to its natural state, thus retracting to retain the body 244 of the second connecting elements 224. In this way, movement of the first elastic connecting elements 214 toward a direction opposite to direction M is prevented, which provides a reliable connection between the insulator 210 and the engine hood 220 and avoids a disengagement of this connection.

In some embodiments, as shown in FIG. 4, the second connecting elements 224 may each include a retaining part 246. The retaining part 246 may be disposed on a free end of the body 244 of the second connecting elements 224, the free end opposite to the fixed end 242. The retaining part 246 may extend from the free end of the body 244 toward the inner surface 262 of the engine hood 220. At the assemble position (i.e., the body 244 of the second connection element is received under the first elastic connecting element), the retaining part 246 may further prevent a movement of the first elastic connecting elements 214. Specifically, the retaining part 246 may restrict the first elastic connecting elements 214 from moving in a direction opposite to direction M and disconnected. In this way, the retaining part 246 may provide an additional stop for the first elastic connecting elements 214, which may avoid the disengagement of the first elastic connecting elements 214 and the second connecting elements 224. The retaining part 246 may support the body 244 to hold the middle part of the first elastic connecting elements 214, and thus form a more reliable connection between the insulator 210 and the engine hood 220.

In some embodiments, the retaining part 246 and the inner surface 262 of the engine hood 220 define an insertion gap therebetween. There are no specific limitations for the insertion gap in the present disclosure, provided the insertion gap allows inserting or receiving of the second connecting elements 224 between the middle part of the first elastic elements 214 and the inner layer 216 of the insulator 210. In some embodiments, the insertion gap may have a size (for example, a distance from the end of the retain part 246 to the inner surface 262) larger than or equal to the thickness of the middle part of the first elastic connecting elements 214. In this way, the first elastic connecting elements 214 may pass the insertion gap and engage with the second connecting elements 224 during the assembly of the insulator 210, and it is easy to assemble the engine hood assembly 230. In some embodiments, the insertion gap has a size smaller than the thickness of the middle part of the first elastic connecting elements 214, as shown in FIG. 4. During assembly of the insulator, the insulator 210 may be moved along direction M then contact the second connecting elements 224, the middle part of the first elastic connecting elements 214 may be deformed by the insertion of the second connecting elements 224. Specifically, the middle part may stretch in its lengthwise direction (e.g. a direction vertical to the paper plane in FIG. 4) while its thickness is reduced, then the middle part with a reduced thickness may be inserted through the insertion gap and then received between the retaining space between the second connecting elements 224 and the inner surface 262 of the engine hood 220. At this time, the middle part may deform as it tends to recover. The middle part may retract and will then have a thickness substantially similar as its original thickness, e.g. the thickness before the stretch of the middle part. As the size of the insertion gap is smaller than the thickness of the middle part, it further prevents the middle part 144 from moving in the direction opposite to direction M. In this way, disengagement of the first elastic connecting elements 214 and the second connecting elements 224 may be avoided. The engine hood assembly 230 according to embodiments of the present dsiclosure provides an insulator 210 having a more reliable connection with the engine hood 220.

It should be appreciated that the second connecting elements may have other structures that can form a detachable connection with the first elastic connecting elements, such as clips.

It should be appreciated that the disassembly process of the insulator 210 is substantially the opposite as its assembly process, which may be known to those with ordinary skill in the art from the description above, thus details thereof are omitted herein.

Figure 5:
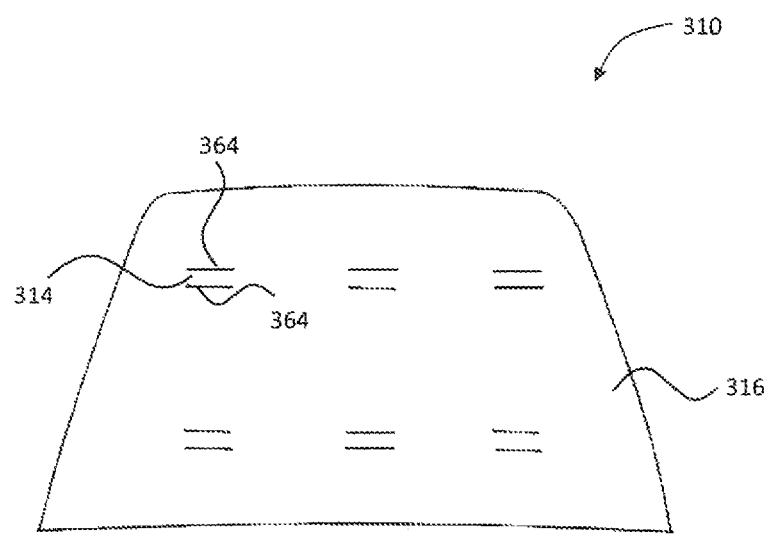
FIG. 5 is a top view showing an engine hood insulator in a vehicle according to an embodiment of the present disclosure.
Figure 6:
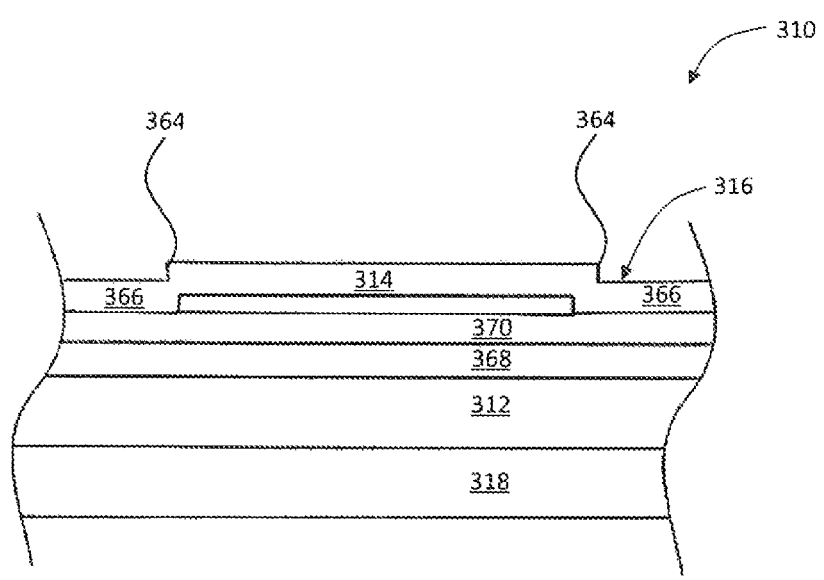
FIG. 6 is a cross-sectional view of the engine hood in FIG. 5.

FIG. 5 is an schematic view of an engine hood insulator 310 for a vehicle according to an embodiment of the present disclosure. FIG. 6 is an enlarged view for a portion of the insulator 310 in FIG. 5. Referring to FIGS. 5 and 6, the insulator 310 includes an outer layer 318, an inner layer 316, and an insulating layer 312 disposed between the inner and outer layers 316, 318. As shown in FIG. 5, the inner layer 316 may be formed from elastic materials and includes a plurality of pairs of notches 364. The portion of the inner layer 316 defined between the pairs of notches 364 may form a plurality of first elastic connecting elements 314. The first elastic connecting elements 314 may stretch and their middle portion may deform and move away from the inner surface of the insulator 310 upon contact or insertion of a plurality of second connecting elements of the engine hood.

In one or more embodiments, the inner and outer layers 316, 318 may be consisted of one layer or include a plurality of sublayers independently. As shown in FIG. 6, the inner layer 316 may include an outer sublayer 366, an inner sublayer 368 disposed on the insulating layer 312, and a middle sublayer 370 disposed between the inner and outer sublayers 366, 368. In some embodiments, the notches 364 are formed in the outer sublayer 366. The first elastic connecting elements 314 are defined by the outer sublayer 366, and each has a thickness substantially similar to the thickness of the outer sublayer 366. In some embodiments, the notches 364 are formed in both the outer sublayer 366 and the middle sublayer 370. The first elastic connecting elements 314 are defined by both the outer sublayer 366 and the middle sublayer 370, and each has a thickness substantially equal to a sum of thicknesses of the outer sublayer 366 and the middle sublayer 370.

As described above, the first elastic connecting elements of the insulator according to embodiments of the present disclosure may be connected to the insulator or the inner layer of the insulator, such as those shown in FIGS. 2-4. Alternatively, the first elastic connecting elements may be defined by the inner layer, such as those shown in FIGS. 5 and 6. In some embodiments, the notches 364 may extend through the whole thickness of the inner layer 316 and each of the first elastic connecting elements 314 is defined between a pair of notches 364, as shown in FIG. 5. In other words, the thickness of each of the first elastic connecting elements 314 is equal to the thickness of the inner layer 316. In some embodiments, the notches 364 are defined by the inner layer 316 and extend through a portion of the whole thickness of the inner layer 316, i.e. the notches 364 do not penetrate through the whole thickness of the inner layer 316. In such embodiments, each of the first elastic connecting elements 314 is defined between a pair of notches 364 and has a thickness smaller than that of the inner layer 316. For example, as shown in FIG. 6, the first elastic connecting elements 314 are defined only by the outer sublayer 366, the thickness thereof is the same as that of the outer sublayer 366 and smaller than that of the inner layer 316.

It should be appreciated that, in the embodiments in which the first elastic connecting elements 314 are defined by the inner layer 316, layers of the first elastic connecting elements 314 (e.g. the whole inner layer or a sublayer of the inner layer) and the layer disposed below (e.g. the insulating layer or remaining layers of the inner layer) may form a connection with suitable adhesion. For example, the adhesion may be reduced, such that the first elastic connecting elements may be formed easily by stretching the portion of the inner layer defined between the notches in a direction away from the insulator. In some embodiments, the sublayer defining the first elastic connecting elements and the sublayer connected with this sublayer may be contacted without using adhesives or without application of force, thus facilitating forming the first elastic connecting elements by strecthing the portions between the notches. In this way, the first elastic connecting elements may be defined by the inner layer, and manufacturing cost for the insulator may be further reduced.

Structures, connections, and functions of the insulator may refer to those embodiments desribed with reference to FIGS. 2-4, thus details thereof are omitted herein.

As described, the engine hood insulator for a vehicle according to embodiments of the present disclosure includes a plurality of first elastic connecting elements removably connected with a plurality of second connecting elements formed on the engine hood. The insulator is easy to assemble and disassemble which may facilitate the maintenance and replacement. Meanwhile, conventional mounting through holes in the insulator or clips can be avoided, which increases the valid insulating area and and thus enhances the insulating performance of the insulator. Further, manufacturing cost is reduced due to elimination of clips or other connection parts. Furthermore, the insulator of the present disclosure has better appearance because of no connection points on the visible side. In some embodiments, as the first elastic connecting elements may be defined by the insulator and the second connecting elements may be integrally formed with the engine hood, the manufacturing cost may be further reduced.

It should be appreciated that the engine hood insulator 10 for a vehicle and the engine hood assembly 30 for a vehicle may be used for any type of vehicles, such as passenger vehicles, commercial vehicles, etc., and may be used for other purposes such as in agricultural machines, construction machines, ships, airplanes, etc. Those purposes should also be included in the protection scope of the present disclosure.

While exemplary embodiments are described above, it is not intended that these embodiments describe all possible forms encompassed by the claims. The embodiments described above are specific examples that do not describe all possible forms of the disclosure. The features of the illustrated embodiments may be combined to form further embodiments of the disclosed concepts. The words used in the specification are words of description rather than limitation, and it is understood that various changes can be made without departing from the spirit and scope of the disclosure. The scope of the following claims is broader than the specifically disclosed embodiments and also includes modifications of the illustrated embodiments.

What is claimed:

1. An engine hood insulator, comprising:
   an inner layer;
   an outer layer;
   an insulating layer, wherein the insulating layer is disposed between the inner layer and the outer layer; and
   a plurality of first elastic connecting elements coupled with the insulating layer and configured to be connected with a plurality of second connecting elements disposed on a lower surface of an engine hood, and wherein each of the plurality of first elastic connecting elements are disposed on a surface of the inner layer via adhesion, sewing, stapling, or combinations thereof.

2. The engine hood insulator of claim 1, wherein each of the first elastic connecting elements has two opposite ends fixed on the surface of the inner layer and a middle part between the two opposite ends, and wherein the middle part is capable of being extended or retracted from the surface of the inner layer.

3. The engine hood insulator of claim 1, wherein each of the first elastic connecting elements includes rubber.

4. The engine hood insulator of claim 1, wherein the plurality of first elastic connecting elements are arranged as a plurality of columns along a lengthwise direction on the surface of the inner layer.

5. The engine hood insulator of claim 1, further comprising a washer disposed between one of the first elastic connecting elements and the surface of the inner layer.

6. An engine hood assembly comprising:
   an insulator, wherein the insulator includes an inner layer, an outer layer, an insulating layer disposed between the inner layer and the outer layer, and a plurality of first elastic connecting elements disposed on a surface of the inner layer, and wherein each of the first elastic connecting element includes two opposite ends fixed on the surface of the inner layer and a middle part between the two opposite ends; and
   an engine hood, wherein the engine hood includes a lower surface facing the insulator and a plurality of second connecting elements disposed on the lower surface of the engine hood, wherein the middle part of each of the first elastic connecting elements is configured to retain the second connecting elements such that the insulator is detachably connected with engine hood.

7. The engine hood assembly of claim 6, wherein the second connecting elements are made from metal and integrally formed with the engine hood.

8. The engine hood assembly of claim 6, wherein the second connecting elements are connected to the lower surface of the engine hood via welding, riveting, clamping, clipping, or combinations thereof.

9. The engine hood assembly of claim 6, wherein each of the second connecting elements comprises a fixed end connected to the lower surface of the engine hood, and a body extending away from the lower surface of the engine hood and forming an angle with the lower surface; and wherein the body and the lower surface of the engine hood define a space therebetween.

10. The engine hood assembly of claim 9, wherein the angle is in a range of 0 to about 5 degrees.

11. The engine hood assembly of claim 9, wherein the second connecting elements are positioned in a direction such that the space opens to an insertion direction of the insulator.

12. The engine hood assembly of claim 9, wherein each of the second connecting elements further comprises a retaining part at a free end and extending from the body towards the lower surface of the engine hood.

13. The engine hood assembly of claim 12, wherein the retaining part and the lower surface of the engine hood define an insertion gap therebetween, the insertion gap has a size no larger than a thickness of the middle part of the first elastic connecting elements.

14. The engine hood assembly of claim 6, wherein the first elastic connecting elements are arranged as a first plurality of columns along a lengthwise direction, and the second connecting elements are arranged as a second plurality of columns along the lengthwise direction corresponding to the first plurality of columns of the first elastic connecting elements.

15. The engine hood assembly of claim 6, wherein the engine hood comprises an outer panel and an inner panel connected under the outer panel, the inner panel faces the engine, and the second connecting elements are disposed on a lower surface of the inner panel.

16. A vehicle comprising an engine hood assembly, wherein the engine hood assembly comprises:
   an insulator including an inner layer, an outer layer, an insulating layer disposed between the inner layer and the outer layer, and a plurality of first elastic connecting elements disposed on a surface of the inner layer, wherein each of the first elastic connecting elements includes two opposite ends fixed on the surface of the inner layer and a middle part between these two ends; and
   an engine hood including a lower surface facing the insulator and a plurality of second connecting elements disposed on the lower surface of the engine hood, wherein the middle part of each of the first elastic connecting elements is configured to retain corresponding one of the second connecting elements such that the insulator is detachably connected with the engine hood.

17. The vehicle of claim 16, wherein each of the second connecting elements comprises a fixed end connected to the lower surface of the engine hood and a body extending away from the lower surface of the engine hood, and wherein the body and the lower surface of the engine hood define a space therebetween.

* * * * *